United States Patent [19]

Molina

[11] 4,236,562

[45] Dec. 2, 1980

[54] RATCHET BOLT ASSEMBLY

[75] Inventor: Jorge W. Molina, Torrance, Calif.

[73] Assignee: Deutsch Fastener Corp., El Segundo, Calif.

[21] Appl. No.: 968,492

[22] Filed: Dec. 11, 1978

[51] Int. Cl.³ ............................................. F16B 41/00
[52] U.S. Cl. ........................................ 151/69; 151/13
[58] Field of Search ........................ 151/69, 13, 11, 10, 151/9, 34, 41, 40, 39, 37

[56] References Cited

U.S. PATENT DOCUMENTS

| | | | |
|---|---|---|---|
| 884,290 | 4/1908 | DeOca | 151/40 |
| 1,143,127 | 6/1915 | Mentzer | 151/13 |
| 1,403,902 | 1/1922 | Fields | 151/13 |
| 1,509,948 | 9/1924 | Hall | 151/13 |
| 1,595,175 | 8/1926 | Vosen | 151/13 X |
| 2,042,267 | 5/1936 | McCulloch | 151/13 X |
| 2,251,560 | 8/1941 | White | 151/41 X |
| 3,188,115 | 6/1965 | Morrish et al. | 151/41 X |
| 3,192,980 | 7/1965 | Sauter | 151/69 X |
| 3,195,600 | 7/1965 | Middleton | 151/69 |
| 3,250,559 | 5/1966 | Sommerfield | 151/69 X |
| 3,275,055 | 9/1966 | Gutshall | 151/37 |
| 3,294,140 | 12/1966 | Cosenza | 151/69 X |
| 3,343,581 | 9/1967 | Martin et al. | 151/69 |
| 3,368,602 | 2/1968 | Boyd | 151/69 X |
| 3,404,716 | 10/1968 | Cosenza | 151/69 X |
| 3,765,465 | 10/1973 | Gulistan | 151/69 |
| 4,034,788 | 7/1977 | Melone | 151/41 X |

*Primary Examiner*—Ramon S. Britts
*Attorney, Agent, or Firm*—Gausewitz, Carr & Rothenberg

[57] ABSTRACT

This invention provides a self-retracting and self-locking bolt assembly for fixed attachment to a workpiece to removably secure the workpiece to a second workpiece containing a mating internally threaded fastening device. A bolt has a shank with rolled threads on its outer end and an exterior shank shoulder, adjacent the head, which faces the threaded section. A collar circumscribes the shank and is slidably retained on the shank, by the rolled threads, between the shoulder and the rolled threads. The head is axially spring-biased away from the collar. The collar is in turn slidably and nonrotatably retained coaxially within the longitudinal passage through a cylindrical ferrule. The collar is also axially spring-biased, within the ferrule, towards the shank shoulder with a force greater than the head-biasing force. As the bolt is pressed axially through the collar and ferrule, the shoulder enters the ferrule passage, contacts the collar and presses it through the passage against the spring force upon the collar. During rotational tightening of the bolt, mating ratchet teeth upon the contacting surfaces of the shoulder and collar slip past one another. After tightening, the spring-enforced contact between the mating ratchet teeth precludes rotational bolt loosening from vibration and the like but permits subsequent loosening with the wrench. When the bolt is disengaged from its mating fastening device, and the wrench removed, the bolt and collar are spring-returned to their fully biased positions.

12 Claims, 5 Drawing Figures

U.S. Patent
Dec. 2, 1980
4,236,562
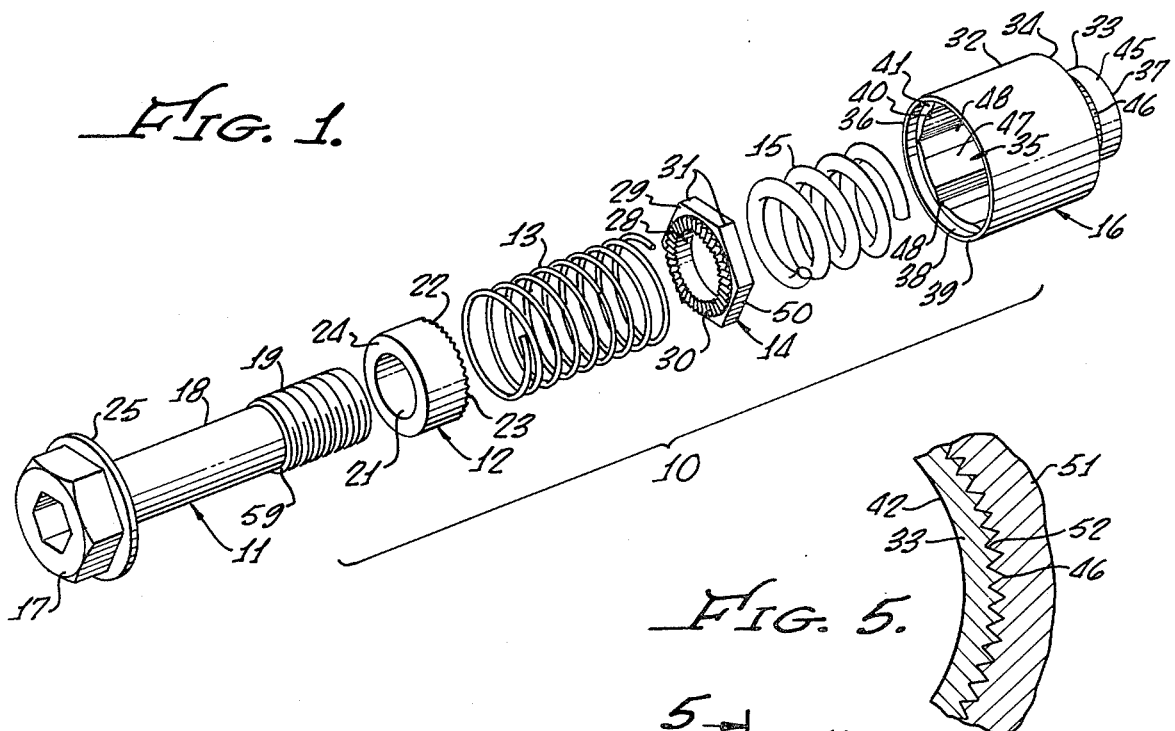
FIG. 1.
FIG. 5.
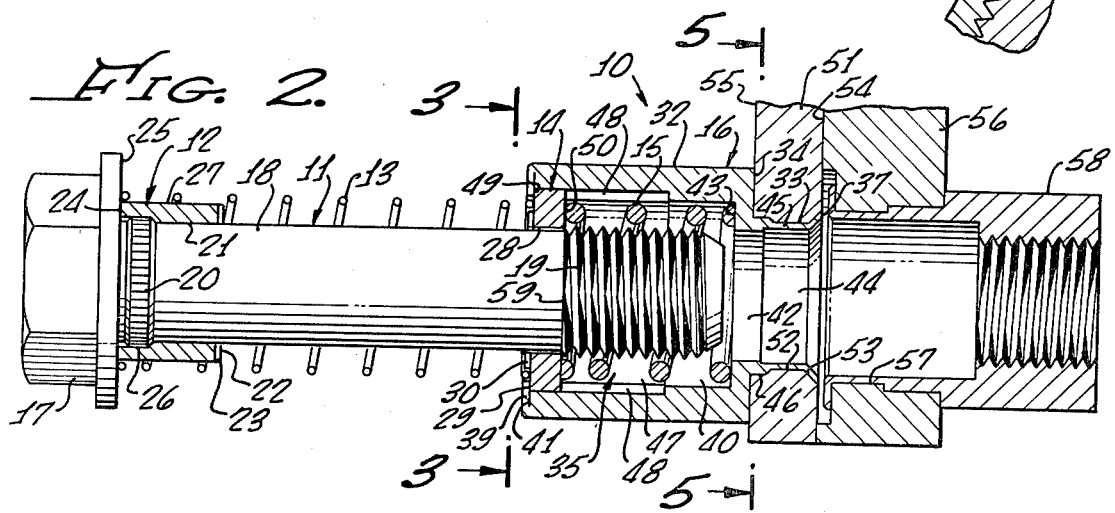
FIG. 2.
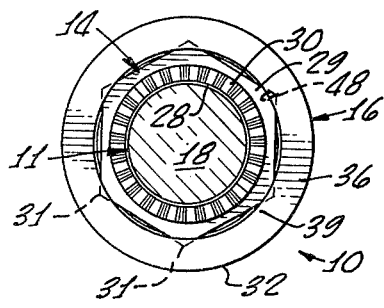
FIG. 3.
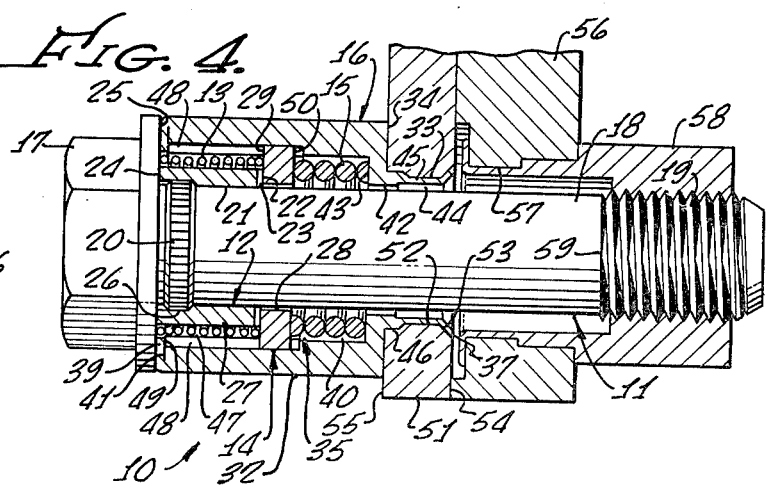
FIG. 4.

RATCHET BOLT ASSEMBLY

BACKGROUND OF THE INVENTION

1. Field of the Invention

This invention relates to a lockable fastener.

2. Description of Prior Art

Traditional threaded fastening devices for attaching objects in a vibration prone environment are subject to undesirable loosening eventually precipitated by such vibration or other undesirable external forces. In an attempt to alleviate this loosening problem in a threaded fastening system, various lockable nut and bolt devices have been employed in which the rotational locking mechanism has been integral with or closely adjacent to the nut or the bolt head and resiliently impressed thereon. However, one or more of the following undesirable characteristics are inherent in such devices.

One such problem has been that a special tool is often required to disengage the locking means prior to loosening of the threaded connection with a wrench. Additionally, the components of such devices are usually separate, requiring some degree of assembly prior to each fastening operation and allowing the components to fall away from the fastened objects upon loosening of the device, thus being lost or causing damage to adjacent mechanisms. Another problem encountered with traditional lockable threaded fastening devices is that the rotational locking characteristics of some such devices are dependent upon the configuration of a portion of one of the objects to be fastened. The result is that a given device of this type is unsuitable for use on an object having a different configuration. A further problem encountered is that some devices do not provide for loosening of the threaded connection, after tightening, without damage to the workpiece and/or some of the fastening device components.

SUMMARY OF THE INVENTION

The present invention provides a pre-assembled rotationally self-locking bolt assembly for fixed attachment to a first workpiece, such as an aircraft panel, permitting removable threaded attachment of the first workpiece to a second workpiece containing a mating, internally threaded fastening device. The components of the assembly are non-removably joined together. When the assembly is fixedly attached to the first workpiece and the threaded connection to the second workpiece is disengaged, this feature precludes loss of any assembly components from the first workpiece and permits ready reattachment of the workpieces. The efficacy of the assembly is substantially independent of the configuration of the first workpiece, thus permitting use of the assembly upon a wide variety of workpieces. Once tightened, the bolt is precluded from lossening when subjected to vibration or other undesirable external forces. However, it may be loosened with a wrench without the necessity of an additional loosening tool and without resulting damage to the workpieces and/or the assembly components. The assembly is fully self-locking when the bolt is tightened and does not require the subsequent addition of additional locking devices such as cotter pins and the like. Moreover, the self-locking feature of the assembly is associated solely with the bolt and is independent of the nature or configuration of the mating fastening device on the second workpiece.

The invention includes a bolt having a sleeve fixedly attached and coaxially circumscribing a portion of the bolt shank adjacent to the bolt head. Upon the end of the sleeve remote from the bolt head are radially projecting ratchet teeth. A collar with a hexagonally shaped periphery is slidably mounted upon the shank with the bore through the collar coaxially circumscribing the shank. Rolled threads on the outer shank end retain the collar on the shank. The collar end surfaces are perpendicular to the shank and the end surface facing the sleeve contains radially projecting ratchet teeth, annular to the shank, having a configuration and size identical to those on the sleeve. The bolt head is biased away from the collar by a compression spring, having an internal coil diameter slightly larger than the sleeve diameter, which circumscribes the shank and engages the opposing surfaces of the bolt head and collar.

The collar is carried coaxially within a portion of the axial opening through a ferrule by radial slots, extending axially within the opening, which slidably engage the exterior points of the hexagonally-shaped collar. This permits the collar to slide axially within the ferrule but precludes relative rotation between the collar and ferrule. The collar is also captively retained within the ferrule. Because the collar is also retained on the bolt shank, this additionally precludes removal of the ferrule from the bolt. A compression spring mounted axially within the ferrule, circumscribing the rolled threads and engaging the inner surface of the collar and an interior shoulder within the ferrule opening, biases the collar towards the end of the ferrule facing the bolt head. This spring is stronger than the spring on the bolt.

As the bolt is pressed towards and through the ferrule and collar, the bolt spring is compressed and the sleeve enters the ferrule, contacting the collar, the ratchet teeth on the sleeve engaging the mating ratchet teeth on the collar. Prior to such contact, the collar remains in its fully biased position within the ferrule since the ferrule spring is stronger than the bolt spring. When the bolt is pressed further, the sleeve forces the collar axially along the ferrule opening against the force of the ferrule spring. As the bolt is then rotated relative to the ferrule and tightened into its mating fastening device, the ratchet teeth on the rotating sleeve slip over the ratchet teeth on the collar which is precluded from rotating relative to the ferrule. After the bolt is tightened, the spring-enforced engagement of the mating ratchet teeth precludes its rotational loosening from undesirable external forces such as vibration.

However, the bolt may be subsequently loosened with a wrench which overcomes the ferrule spring force and causes the mating ratchet teeth to again slip over one another. After the bolt is disengaged from its fastening device and the wrench is removed, the collar and bolt head are spring-returned to their fully biased positions.

BRIEF DESCRIPTION OF THE DRAWINGS

FIG. 1 is an exploded perspective view of the ratchet bolt assembly of this invention;

FIG. 2 is a longitudinal sectional view illustrating the ratchet bolt assembly fully attached to a first workpiece and ready for use in attaching a second workpiece to the first workpiece;

FIG. 3 is a sectional view of the ratchet bolt assembly taken along line 3—3 of FIG. 2, illustrating the manner in which the collar is retained within the ferrule, in turn retaining the threaded portion of the bolt within the ferrule;

FIG. 4 is a longitudinal sectional view of the ratchet bolt assembly in use, showing the bolt fully fastened into a mating threaded fastening device attached to the second workpiece, fastening the first workpiece, to which the ratchet bolt assembly is attached, to the second workpiece; and FIG. 5 is an enlarged fragmentary sectional view, taken along line 5—5 of FIG. 2, illustrating the manner in which the knurl on the ferrule becomes embedded in the periphery of the bore in the first workpiece to prevent rotation of the ferrule.

DETAILED DESCRIPTION OF THE PREFERRED EMBODIMENT

The preferred embodiment of the ratchet bolt assembly 10 of this invention is shown in exploded perspective view in FIG. 1 of the drawing and includes a fastening member or bolt 11, a cylindrical sleeve 12, a helical compression spring 13, an annular locking member or collar 14, a helical compression spring 15 and a retaining member or cylindrical ferrule 16.

The bolt 11 has a hexagonal-socket head 17, a cylindrical shank 18 and a rolled, threaded section 19 on the outer end of the shank 18. Adjacent the head 17 and extending around the entire outer perimeter of an axial portion of the shank 18 is a straight knurl 20.

The sleeve 12 has a bore 21 of a diameter permitting insertion of the shank 18 through the sleeve 12, the diameter, however, being less than the external diameter of the straight knurl 20. Projecting axially away from one end 22 of the sleeve 12, and annular to the bore 21, are radially extending ratchet teeth 23. When the sleeve 12 is mounted on the shank 18, with the ratchet teeth 23 facing away from the head 17, and pressed past the straight knurl 20 so that end 24 of the sleeve 12 abuts the underside 25 of the head 17, an interference fit 26 results between the straight knurl 20 and the sleeve 12, the knurl 20 becoming embedded in the periphery of bore 21. This precludes relative rotation between the sleeve 12 and the bolt 11 and forms a cylindrical enlargement 27 of an axial portion, adjacent the head 17, of the shank 18. It should be noted that the cylindrical enlargement 27 may, alternatively, be an integral part of the shank 18.

The collar 14 has a bore 28 of a diameter slightly larger than the diameter of the shank 18 and smaller than the external thread diameter of the threaded section 19 of the shank 18. Projecting axially away from one end 29 of the collar 14, and annular to the bore 28, are radially extending ratchet teeth 30 which have a size and configuration identical to those on the sleeve 12. The exterior perimeter of the collar 14 is hexagonally shaped, having external points 31 extending along the length of the collar 14. The collar 14 is slidably mounted on the shank 18 between the sleeve 12 and the threaded section 19 with the ratchet teeth 30 facing the ratchet teeth 23 on the sleeve 12. Since the external thread diameter of the threaded section 19 is greater than the diameter of bore 28, the collar 14 is retained upon shank 18.

The helical compression spring 13 has an internal coil diameter slightly larger than the diameter of the sleeve 12 and circumscribes the shank 18, engaging the underside 25 of the head 17 and the end 29 of the collar 14. This biases the head 17 away from the collar 14 in the assembled fastener.

The ferrule 16 has a cylindrical section 32 and a second cylindrical section 33, which has a smaller diameter and extends coaxially away from the inner end 34 of the first cylindrical section 32. An axial passage 35 runs longitudinally through the ferrule 16 from the outer end 36 of the first cylindrical section 32 to the outer end 37 of the second cylindrical section 33. The axial passage 35 includes a short bore 38 extending inwardly from the outer end 36 of the first cylindrical section 32, resulting in a relatively thin bendable wall 39 annular to bore 38.

Commencing at the inward termination, within the first cylindrical section 32, of bore 38 is a bore 40 which extends inwardly through a further portion of the first cylindrical section 32. The bore 40 has a smaller diameter than that of bore 38, thus forming an interior ferrule shoulder 41.

Commencing at the inward termination, within the first cylindrical section 32, of the bore 40 is a bore 42 which extends through the remainder of the first cylindrical section 32 and into a portion of the second cylindrical section 33. The bore 42 has a smaller diameter than that of the bore 40, thus forming an interior ferrule shoulder 43. Additionally, the diameter of the bore 42 is slightly larger than the external thread diameter of the threaded section 19.

Commencing at the outer end 37 of the second cylindrical section 33 is a bore 44 which extends inwardly to the inward termination of the bore 42, thus completing the axial passage 35 and forming a relatively thin bendable wall 45 annular to the bore 42.

Adjacent the inner end 34 of the first cylindrical section 32, and extending around the entire outer perimeter of an axial portion of the second cylindrical section 33, is a straight knurl 46.

The interior surface 47 of the first cylindrical section 32 contains a plurality of axially extending slots 48 which define the tip portions of a hexagon substantially identical in size to that defined by the periphery of the collar 14. The slots 48 begin at the interior ferrule shoulder 41 and extend axially inward along a portion of the length of the bore 40. The points 31 of the collar 14 are slidably engaged by the surfaces of the slots 48, as indicated in FIGS. 2–4 of the drawing, and cooperate with the slots 48 to guide the collar 14 axially within the ferrule 16 and preclude rotation of the collar 14 relative to the ferrule 16.

The collar 14 is retained within the first cylindrical section 32, with the ratchet teeth 30 facing away from the interior ferrule shoulder 43, by the inwardly projecting flange 49, resulting from a radially inward flaring of the thin wall 39 against the interior ferrule shoulder 41, which forms an abutment. Since the collar 14 is retained both upon the shank 18 and within the first cylindrical section 32, removal of the bolt 11 from the ferrule 16 is precluded.

The spring 15, which is substantially stronger than the spring 13, has an internal coil diameter slightly larger than the external thread diameter of the threaded section 19 and an external coil diameter slightly smaller than the diameter of the bore 40. The spring 15 is mounted axially within the bore 40, circumscribing a portion of the shank 18, and engages the inner end 50 of the collar 14 and the internal ferrule shoulder 43. The collar 14 is biased axially within the bore 40 by the spring 15 to a position where the end 29 of the collar 14 contacts the abutment formed by the flange 49.

A first workpiece 51 has a bore 52 through it having a diameter smaller than the external diameter of the straight knurl 46 on the second cylindrical section 33, but permitting insertion of the second cylindrical section 33 into the bore 52. The bore 52 has a countersink 53 at its end adjacent to the inner surface 54 of the first workpiece 51. The assembly 10 is fixedly attached to the first workpiece 51 by pressing the second cylindrical section 33 into the bore 52, until the inner end 34 of the first cylindrical section 32 abuts the outer surface 55 of the first workpiece 51, resulting in an interference fit between the straight knurl 46 and the first workpiece 51. The knurl 46 becomes embedded in the periphery of bore 52, as indicated in FIG. 5 of the drawing, thus precluding relative rotation between the ferrule 16 and the first workpiece 51. The thin wall 45 is then flared outwardly against the countersink 53 in bore 52, thus precluding axial withdrawal of the ferrule 16 from the first workpiece 51.

FIG. 2 of the drawings illustrates the ratchet bolt assembly 10 attached to the first workpiece 51 as previously described and ready for use. For purposes of illustration, a second workpiece 56 with a bore 57 through it, axially aligned with the ratchet bolt assembly 10, is shown. Fixedly attached to the bore 57 is a representative internally threaded fastening device 58, a clinch nut, for accepting the threaded section 19 of the bolt 11 when the first workpiece 51 and second workpiece 56 are attached by use of this embodiment of the invention. However, any suitable internally threaded fastening device could be fixedly attached to the second workpiece 56 for use with the ratchet bolt assembly 10, or the bore 57 could simply be threaded.

FIG. 2 also illustrates the relative positions of the components of the ratchet bolt assembly 10 effected by springs 13 and 15 prior to the fastening together of workpieces 51 and 56. When the bolt 11 is unattached from its mating fastening device 58, the bolt 11 is in a fully retracted position, with the inner end 59 of the threaded section 19 engaging the collar 14. In addition, the spring 15 fully biases the collar 14 so that it engages the abutment formed by flange 49. With the bolt 11 in its fully biased position with respect to the collar 14 and to the ferrule 16, the bolt 11 is fully withdrawn from its mating fastening device 58 and from within the second workpiece 56 so that the first workpiece 51 may be easily removed from the second workpiece 56 with no interference to such removal by the retained bolt 11.

In operation, the bolt 11 is pressed inwardly towards the fastening device 58, compressing the spring 13 and causing the exterior threads on the threaded section 19 to engage the mating interior threads of the fastening device 58. As the bolt 11 is advanced rotationally, the ratchet teeth 23 on the sleeve 12 are brought to bear against the ratchet teeth 30 on the collar 14. The ratchet teeth 23 and 30 slip over each other as the bolt 11 is so rotated, with the collar 14 being pressed inwardly against the biasing force of the spring 15. Since the spring 15 is stronger than the spring 13, the spring 13 remains compressed during such advancement of the collar 14. During tightening, axial movement of the interface between the ratchet teeth 23 and 30 towards the first workpiece 51 is facilitated by the slots 48 which permit the collar 14 to move axially within the ferrule 16 towards the first workpiece 51 against the force of the spring 15. The slots 48 also preclude the collar 14 from rotating with respect to the ferrule 16 during tightening of the bolt 11.

When the bolt 11 is tightened, the forced interaction between the ratchet teeth 23 and 30 maintained by the spring 15 precludes the bolt 11 from loosening from undesirable external forces, such as vibration, in the following manner. The slots 48 in the ferrule 16 preclude rotation of the collar 14, the ratchet teeth 23 and 30 preclude rotation of the sleeve 12, and the sleeve 12 precludes rotation of the bolt 11. Although unwanted loosening from vibration and the like is precluded, the bolt 11 may be intentionally loosened by overcoming the force exerted by the spring 15 to slip the ratchet teeth 23 and 30 over each other as the bolt 11 is rotated in the reverse direction by a wrench.

As the bolt 11 is loosened, the collar 14 within the ferrule 16 begins to return axially to its fully biased position against the abutment formed by the flange 49 by virtue of the force exerted by the spring 15. When the threaded section 19 of the bolt 11 is disengaged from the fastening device 58 and the wrench is removed, the force exerted by the spring 15 upon the head 17 fully retracts the bolt 11 as indicated in FIG. 2. The bolt 11 is retained within the ferrule 16 as previously described and the ratchet bolt assembly 10 remains attached to the first workpiece 51 for future reattachment to the second workpiece 56, or another workpiece, as desired.

The foregoing detailed description is to be clearly understood as given by way of illustration and example only, the spirit and scope of this invention being limited solely by the appended claims.

I claim:
1. A self-locking fastener device comprising
a bolt having
   a head,
   a shank extending from said head,
   and threads on the outer end of said shank,
a first ratchet member adjacent said head,
   said first ratchet member being rotatable with said shank and having teeth facing toward said outer end of said shank,
a retaining member having means for attachment to a workpiece,
a second ratchet member,
   said second ratchet member having an opening receiving said shank inwardly of said threads,
means for retaining said second ratchet member on said shank with freedom for axial movement relative to said shank inwardly of said threads, while permitting relative rotation of said shank and said second ratchet member,
   said second ratchet member having teeth facing toward and engageable with said teeth of said first ratchet member,
   said second ratchet member being retained by said retaining member with freedom for limited axial movement thereof between a first position relatively adjacent said head of said bolt and a second position relatively remote therefrom, while being prevented from substantial rotation relative to said retaining member,
a first spring biasing said second ratchet member toward said first position,
and a second spring engaging said bolt and exerting a force biasing said bolt toward a retracted position and said second ratchet member toward said second position,
   said first spring being stronger than said second spring whereby said second ratchet member is maintained in said first position upon axial advancement of said bolt until said first ratchet member engages said second ratchet member, and thereafter said second ratchet member is moved by said first ratchet member toward said second position.

2. A device as recited in claim 1 in which said first spring engages one side of said second ratchet member and said second spring engages the opposite side of said second ratchet member and the undersurface of said head.

3. A device as recited in claim 2 in which said teeth of said second ratchet member are on said opposite side thereof, and said second spring engages said opposite side of said second ratchet member radially outwardly of said teeth of said second ratchet member.

4. A device as recited in claim 1 in which said retaining member includes a first end adjacent said head, a second end remote from said head, and an abutment at said first end for limiting movement of said second ratchet member to said first position.

5. A device as recited in claim 4 in which said means for attachment to a workpiece includes a wall at said second end bendable to form a flange for engaging such a workpiece.

6. A self-locking fastening device comprising
a bolt having
 a head,
 a shank extending from said head,
 and threads on the outer end of said shank,
  said threads having a greater maximum diameter than the diameter of said shank inwardly thereof,
a first ratchet member adjacent said head,
 said first ratchet member being rotationally and axially fixed relative to said shank and having teeth facing toward said outer end of said shank,
a ferrule receiving said shank,
 said ferrule including means for attachment to a workpiece,
a second ratchet member in said ferrule,
 said second ratchet member having an opening receiving said shank inwardly of said threads,
  said maximum diameter of said threads being greater than the diameter of said opening in said second ratchet member whereby said second ratchet member is retained on said shank and is slidable axially along said shank inwardly of said threads,
 said second ratchet member having teeth facing toward said first ratchet member,
 said second ratchet member and said ferrule having interengaging means for preventing rotation of said second ratchet member relative to said ferrule while permitting axial movement of said second ratchet member relative to said ferrule,
 said ferrule having an abutment at one end thereof for retaining said second ratchet member in said ferrule while permitting said teeth of said second ratchet member to engage said teeth of said first ratchet member,
a first spring in said ferrule engaging one side of said second ratchet member and biasing said second ratchet member toward said abutment,
and a second spring circumscribing said shank,
 one end of said second spring engaging the undersurface of said head and the opposite end of said second spring engaging the opposite side of said second ratchet member,
 said first spring being stronger than said second spring, whereby said second ratchet member is retained in engagement with abutment upon axial advancement of said bolt until said first ratchet member engages said second ratchet member, and thereafter said second ratchet member is moved by said first ratchet member toward the opposite end of said ferrule.

7. A device as recited in claim 6 wherein said first ratchet member includes a sleeve circumscribing said shank with one end thereof adjacent said head, said teeth of said first ratchet member being formed on the end of said sleeve remote from said head.

8. A device as recited in claim 7 in which said shank includes a straight knurl, the inner wall of said sleeve being embedded in said knurl so as to prevent relative rotation of said sleeve and said shank.

9. A device as recited in claim 6 wherein said interengaging means for preventing rotation of said annular member relative to said ferrule includes slot means in said ferrule, and projecting means on said annular member received in said slot means, said slot means extending axially within said ferrule for permitting axial movement of said annular member relative to said ferrule while precluding rotation of said annular member relative to said ferrule.

10. A device as recited in claim 9 wherein said slot means is defined by the tip portions of a hexagon, thereby defining a plurality of slots, and wherein said annular member has a hexagonal periphery having tip portions received in said plurality of slots.

11. A device as recited in claim 10 wherein said means for attachment includes a relatively thin-walled end portion of said ferrule adapted for being bent outwardly for forming a flange for holding said ferrule to said workpiece.

12. A device as recited in claim 6 wherein said abutment is defined by a relatively thin-walled end portion of said ferrule bent inwardly to form a flange.

* * * * *